(12) United States Patent
Ottnad et al.

(10) Patent No.: US 11,123,862 B2
(45) Date of Patent: Sep. 21, 2021

(54) METHOD FOR HANDLING A WORKPIECE WITH THE AID OF A REMOVAL TOOL AND MACHINE FOR CARRYING OUT THE METHOD

(71) Applicant: TRUMPF Werkzeugmaschinen GmbH + Co. KG, Ditzingen (DE)

(72) Inventors: Jens Ottnad, Karlsruhe (DE); Christoph Bloemker, Stuttgart (DE)

(73) Assignee: TRUMPF WERKZEUGMASCHINEN GMBH + CO. KG, Ditzingen (DE)

( * ) Notice: Subject to any disclaimer, the term of this patent is extended or adjusted under 35 U.S.C. 154(b) by 0 days.

(21) Appl. No.: 16/953,359

(22) Filed: Nov. 20, 2020

(65) Prior Publication Data

US 2021/0114207 A1   Apr. 22, 2021

Related U.S. Application Data

(63) Continuation of application No. PCT/EP2019/061794, filed on May 8, 2019.

(30) Foreign Application Priority Data

May 23, 2018   (DE) ...................... 10 2018 208 126.3

(51) Int. Cl.
*B25J 9/16* (2006.01)
*B25J 15/06* (2006.01)
*B25J 13/08* (2006.01)

(52) U.S. Cl.
CPC ............. *B25J 9/1612* (2013.01); *B25J 13/08* (2013.01); *B25J 15/0616* (2013.01)

(58) Field of Classification Search
CPC ...... B25J 6/1612; B25J 13/08; B25J 15/0616; B25J 15/0683
USPC ......................................... 294/188, 185, 907
See application file for complete search history.

(56) References Cited

U.S. PATENT DOCUMENTS

| | | | |
|---|---|---|---|
| 6,246,476 B1 | 6/2001 | Frohn et al. | |
| 7,717,482 B2* | 5/2010 | Iwasaki | B65G 21/2036 294/64.3 |
| 10,926,417 B2* | 2/2021 | Eto | B25J 13/08 |
| 2007/0255447 A1 | 11/2007 | Dunkmann et al. | |
| 2011/0238213 A1* | 9/2011 | Nagasaka | B25J 9/1612 700/253 |
| 2014/0025197 A1 | 1/2014 | Haenschke et al. | |

(Continued)

FOREIGN PATENT DOCUMENTS

| | | |
|---|---|---|
| DE | 3612144 A1 | 10/1987 |
| DE | 19754974 C1 | 3/1999 |

(Continued)

*Primary Examiner* — Paul T Chin
(74) *Attorney, Agent, or Firm* — Leydig Voit & Mayer Ltd.

(57) ABSTRACT

A method handles a workpiece with a removal tool. The method includes: generating at least one parameter for the removal tool; determining at least one characteristic variable from the at least one parameter and at least one item of workpiece information; creating a removal prediction taking into account the characteristic variable and at least one removal result from a removal result store; assessing the removal prediction; removing the workpiece in the event of a positive removal prediction; detecting the removal result; and storing the removal result in the removal result store.

15 Claims, 2 Drawing Sheets

(56) References Cited

U.S. PATENT DOCUMENTS

| | | | | |
|---|---|---|---|---|
| 2014/0088949 A1* | 3/2014 | Moriya | ............... | B25J 9/1612 |
| | | | | 703/22 |
| 2014/0277721 A1* | 9/2014 | Tomo | ............... | B25J 9/1612 |
| | | | | 700/253 |
| 2016/0082615 A1* | 3/2016 | Saito | ............... | B26D 7/1818 |
| | | | | 83/103 |
| 2016/0207195 A1* | 7/2016 | Eto | ............... | B25J 9/1612 |
| 2017/0109876 A1* | 4/2017 | Kitamura | ............... | G06T 7/75 |
| 2017/0176178 A1* | 6/2017 | Inukai | ............... | H04N 5/2256 |
| 2019/0243345 A1* | 8/2019 | Schwarz | ............... | G05B 19/4183 |
| 2019/0244309 A1* | 8/2019 | Ottnad | ............... | G05B 19/41865 |
| 2020/0016647 A1* | 1/2020 | Deiss | ............... | B21D 45/003 |
| 2020/0016742 A1* | 1/2020 | Ishikawa | ............... | B25J 9/163 |

FOREIGN PATENT DOCUMENTS

| | | |
|---|---|---|
| DE | 19814779 A1 | 10/1999 |
| DE | 102004042825 B3 | 1/2006 |
| DE | 102009040343 A1 | 3/2011 |
| DE | 102012012988 A1 | 4/2014 |
| DE | 102015218195 A1 | 3/2017 |
| DE | 102017110998 A1 | 11/2018 |
| EP | 3093078 A1 | 11/2016 |

* cited by examiner

METHOD FOR HANDLING A WORKPIECE WITH THE AID OF A REMOVAL TOOL AND MACHINE FOR CARRYING OUT THE METHOD

CROSS-REFERENCE TO PRIOR APPLICATIONS

This application is a continuation of International Patent Application No. PCT/EP2019/061794, filed on May 8, 2019, which claims priority to German Patent Application No. DE 10 2018 208 126.3, filed on May 23, 2018. The entire disclosure of both applications is hereby incorporated by reference herein.

FIELD

The present invention relates to a method for handling a workpiece with the aid of a removal tool, and to a machine for carrying out such a method.

BACKGROUND

In metal and sheet-material processing machines, in particular in (partly) automated laser cutting/punching machines, removal tools are used in order to remove the produced workpieces from the machine and bring them to a storage location. The removal tools typically comprise a plurality of individual handling elements, such as suction pins (suction cups) and/or extendable pins. In order to successfully remove the workpiece from the machine, it is necessary to save parameters in the machine controller that define which individual handling elements of the removal tool from the plurality provided should be used for the particular workpiece or the particular workpiece type, and how they should be used, and at what position. The selection of the handling elements to be used is often governed in practice by a program that chooses them on the basis of the dimensions, the weight and the center of gravity of the workpiece, or similar criteria. If the handling elements to be used are incorrectly selected, the workpiece might not be removed automatedly, or difficulties may be encountered during the removal process. This leads to machine downtime, which must be rectified by an operator of the machine, which is laborious.

In particular, if new, different kinds of workpieces are to be removed regularly, a considerable effort was necessary up to now in order to determine suitable parameters for the removal process. In addition, failed removals might occur with regular operation if parameters are applied that indeed lead to a successful removal for the most part (for example within the scope of testing), but not always (for example in serial operation).

SUMMARY

An embodiment of the present invention provides a method that handles a workpiece with a removal tool. The method includes: generating at least one parameter for the removal tool; determining at least one characteristic variable from the at least one parameter and at least one item of workpiece information; creating a removal prediction taking into account the characteristic variable and at least one removal result from a removal result store; assessing the removal prediction; removing the workpiece in the event of a positive removal prediction; detecting the removal result; and storing the removal result in the removal result store.

BRIEF DESCRIPTION OF THE DRAWINGS

Embodiments of the present invention will be described in even greater detail below based on the exemplary figures. The present invention is not limited to the exemplary embodiments. All features described and/or illustrated herein can be used alone or combined in different combinations in embodiments of the present invention. The features and advantages of various embodiments of the present invention will become apparent by reading the following detailed description with reference to the attached drawings which illustrate the following.

DETAILED DESCRIPTION

Figure 1:
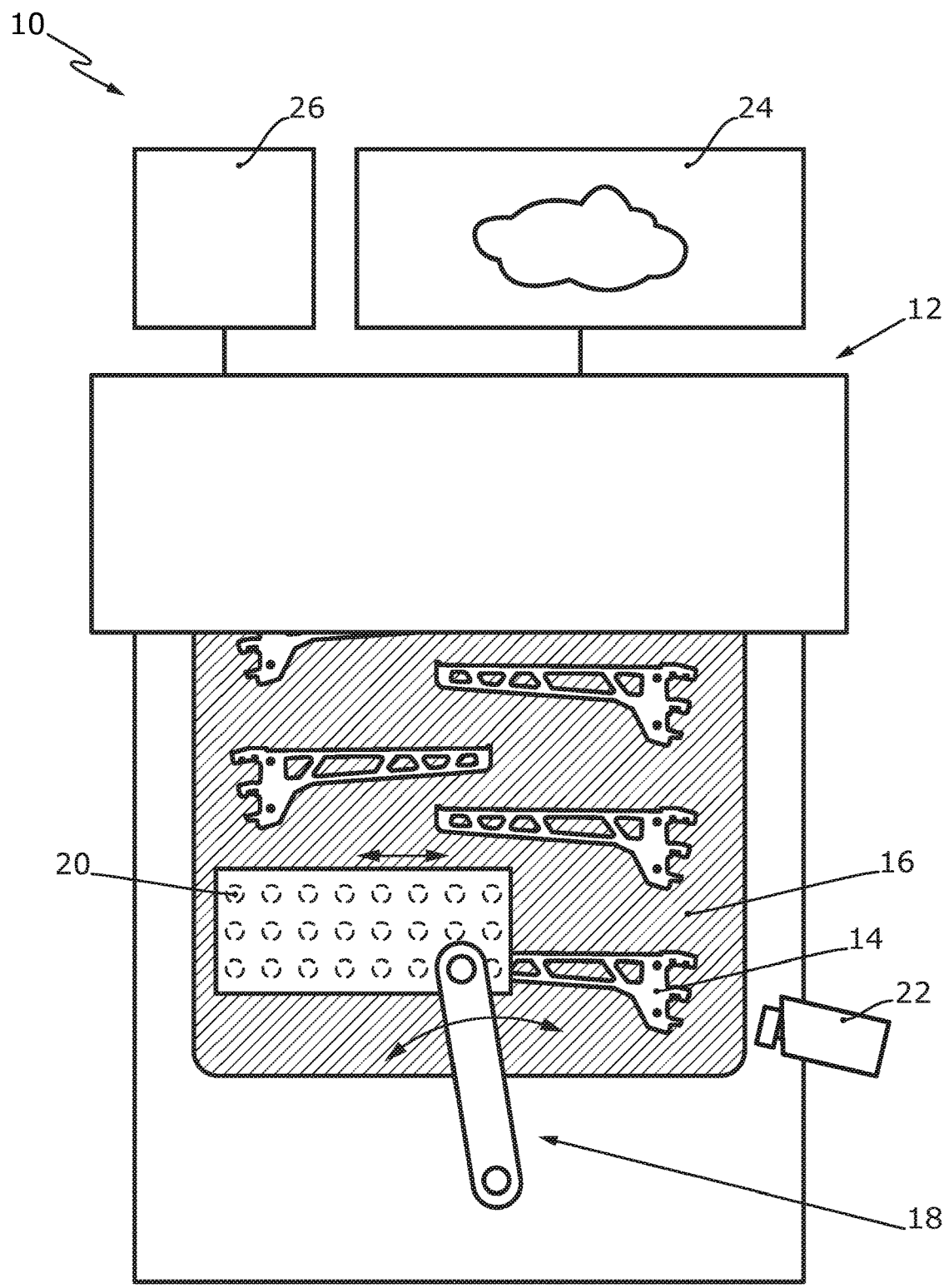
FIG. 1 shows a schematic depiction of a machine according to an embodiment of the present invention with a parameter-controlled removal tool and a cloud-based removal result store.

Embodiments of the present invention provide a method and a machine, which allow the removal of different kinds of workpieces with improved reliability.

In accordance with an embodiment of the present invention, a method is provided for handing a workpiece with the aid of a removal tool, having the method steps of:

B) generating at least one parameter for the removal tool;
C) determining at least one characteristic variable from the at least one parameter and at least one item of workpiece information;
D) creating a removal prediction taking into account the characteristic variable and at least one removal result from a removal result store;
E) assessing the removal prediction;
F) removing the workpiece in the event of a positive removal prediction;
G) detecting the removal result;
H) storing the removal result in the removal result store.

The removal tool can be controlled by the at least one parameter. The actuation of the removal tool resulting from the at least one parameter can be linked to the at least one item of workpiece information by the at least one characteristic variable. In order to create the removal prediction, the at least one characteristic variable determined in method step C) can be compared with a corresponding characteristic variable of the at least one removal result from the removal result store. The removal prediction may specify the likelihood of a successful removal. Here, the term "removal" may mean the entire process, for example with a separation of the workpiece from a scrap skeleton, a transporting of the workpiece to a target position, and a setting down at the target position, inclusive of the rotations and accelerations of the workpiece to be performed during this process as appropriate. The removal prediction may comprise a plurality of different prediction values, for example for separation, lifting, rotation, transport and set-down. In particular, however, the removal prediction relates to the separation of the workpiece from the scrap skeleton. The assessment of the removal prediction may be achieved by comparison with a minimum likelihood for successful removal. More generally, the assessment of the removal prediction may be an arithmetic and/or logical operation. Several predictions may be combined to form a vector or value and may be compared with a corresponding minimum likelihood vector or value. Other arithmetic and logical operations are also conceivable. The result of the assessment of the removal prediction may be a positive or a negative removal prediction. In the event of a positive removal prediction, it is assumed that the removal will be performed correctly and reliably with a predetermined degree of likelihood. The workpiece may then be removed in accordance with the parameters.

Because the removal result (i.e., whether or not the removal was successful) is detected (method step G) and stored (method step H), the data basis for creating the removal prediction in method step D) can be broadened in the event that the method is carried out anew. In other words, if the method is carried out anew, one more removal results will be available in the removal result store. A more accurate removal prediction can thus be obtained. In particular, if the method has been performed several times, it can thus be predicted reliably whether the removal with the selected parameters for the removal tool will be successful. The removal result in this case may comprise an association with the workpiece information, characteristic variable, and/or the parameter.

If a new workpiece for which no functioning parameter for the removal tool is yet known is to be removed, the method according to an embodiment of the present invention allows for an estimation as to whether the applied parameter for the removal tool is expected to lead to a successful removal. Removal attempts with unsuitable parameters can thus be avoided. In particular, when determining the suitable parameter for the removal tool, few or no manual handling operations are necessary because the method according to an embodiment of the present invention identifies unsuitable parameters without the need to perform time-consuming and costly trials. A new workpiece, in particular, may have a different geometry compared to known workpieces for which functioning parameters for the removal tool are known. Furthermore, the new workpiece may correspond, in respect of its geometry, to a known workpiece, but may be arranged differently in a machine, in particular in a different position and/or in a different orientation.

Before the method according to an embodiment of the present invention is implemented with the specified method steps, so as to be able to create an even more precise removal prediction, the method is performed by way of a trial with the modification that the removal is performed also with a negative removal prediction, or with the modification that the assessment criteria in respect of a presumably successful removal are reduced. Unsuccessful removals are thus provoked so that it can be estimated more reliably whether the value of the at least one characteristic value is representative of a successful or unsuccessful removal.

In method step B), a number of parameters are preferably generated for the removal tool. In method step C), at least one characteristic variable is preferably generated from a number of parameters and/or a number of items of workpiece information. A number of characteristic variables are preferably generated. In method step D), a number of characteristic variables and/or a number of removal results are preferably taken into account.

The term "handling" may mean the automated gripping, setting down, discarding, sorting, picking, shaking, vibrating or similar movement of a workpiece. Typically, the workpiece when handled is brought from a first area, in particular within a manufacturing machine, into a second area, in particular outside the manufacturing machine. Alternatively or additionally, when handled, the orientation of the workpiece may be changed, for example by rotation about the vertical axis. In order to handle the workpiece, the removal tool is used. The removal tool may be a controlled pushing mechanism, a sorting or picking device, or a gripping system, for example a mechanical, an adhesive, in particular electrostatic, a magnetic, or a pneumatic gripper, in particular a suction gripper, or the like. The removal tool may also comprise a combination of the aforementioned devices. Typically, the removal tool comprises a plurality of handling elements for engaging the workpiece.

The at least one parameter for the removal tool may comprise one of the following items of information, or a plurality of the following items of information in combination:
   an item of information regarding which selected handling elements of a plurality of handling elements of the removal tool are to be used; and/or
   an operating parameter for the removal tool, for example a suction pressure, pressing force, air pressure, a gripping force and/or disengagement path to be applied.

The operating parameter may relate to all or individual handling elements of the removal tool, in particular individual selected handling elements of the removal tool.

The at least one characteristic variable from the at least one parameter may comprise one of the following variables, or a plurality of the following variables in combination:
   a lifting force, which will be exerted by the removal tool onto the workpiece;
   an item of information regarding a point of engagement resulting from the handling forces, in particular the lifting forces, of a plurality of handling elements of the removal tool acting on the workpiece;
   the number of handling elements of the removal tool acting on the workpiece; and/or
   a torque that is effective about a tilt axis running in particular horizontally and that acts on the workpiece when the workpiece is handled with the selected parameter for the removal tool, in particular wherein a weight force of the workpiece is taken into account when calculating the torque, or wherein the tilt axis runs through the center of mass of the workpiece.

The workpiece information may comprise one of the following items of information, or a plurality of the following items of information in combination:
   an outer contour of the workpiece;
   thickness, weight, or mass of the workpiece;
   a specification of the position and/or orientation of the workpiece;
   unexpected force that must be overcome in order to release the workpiece from a scrap skeleton if the workpiece has been formed beforehand from a sheet material; and/or
   tendency of the workpiece to tilt.

Typically, a plurality of removal results are stored in the removal result store. The removal results in the removal result store may originate from removal tests of the removal tool itself and/or from removal tests of comparable, in particular structurally identical removal tools. Prior to the first run-through of the method according to an embodiment of the present invention, a plurality of removal results determined previously using comparable, in particular structurally identical removal tools can be stored in the removal result store. The plurality of removal results relate typically to removals of different kinds of workpieces each associated with at least one item of workpiece information. If a new kind of workpiece is to be removed, the removal results from known workpieces, which are comparable in respect of their workpiece information to the new kind of workpiece can be used in order to carry out the method.

A method according to an embodiment of the present invention can be preferably carried out on a machine according to an embodiment of the present invention as described below.

Prior to method step B), the following method step is preferably carried out:

forming the workpiece.

The method according to an embodiment of the present invention is thus integrated advantageously into the manufacturing process for the workpiece. The workpiece may be formed in particular from a main body, preferably from a sheet material. The forming is preferably achieved by laser cutting and/or punching. The term "forming" may additionally be: cutting, in particular water jet cutting, plasma cutting or laser cutting, punching, bending, nibbling, etc.

It is preferably provided that, in method step F), a removal tool in the form of a sucker is used, and in method step B), at least one parameter for the removal tool in the form of a sucker is generated. A sucker is particularly suitable for flexible handling of different workpieces, in particular if these are formed from a sheet material. The parameter for the removal tool is preferably generated in the form of a parameter for the sucker placement; a plurality of parameters are preferably produced. A removal tool in the form of a sucker is, for example, a suction gripper. In this case, the ambient pressure presses the workpiece against the suction gripper as soon as the surrounding pressure is greater than the pressure between suction gripper and workpiece. The pressure difference is achieved by connecting the suction gripper to a negative pressure or vacuum generator. This sucks up the air between suction gripper and workpiece. As soon as the suction gripper contacts the workpiece surface and seals it with respect to the ambient pressure, a negative pressure is generated. The higher the pressure difference between ambient pressure and pressure in the suction gripper, i.e. in particular the greater the reduction of the pressure between the suction gripper and the workpiece, the greater the holding force.

It is particularly preferably provided that the sucker used in method step F) has a plurality of suction pins, and in method step B), at least one parameter in the form of a parameter for the suction pin actuation is generated. The sucker may thus be adjusted particularly well to the workpiece. A plurality of parameters for the removal tool are preferably generated, in particular a plurality of parameters for the suction pin actuation. The parameters for the suction pin actuation may determine a selection of the suction pins of the sucker that are to be used in order to handle the workpiece. Alternatively or additionally, a parameter for the suction pin actuation may specify the negative pressure to be generated jointly for all suction pins (as applicable, all suction pins to be used) or separately for individual suction pins. A suction pin may also be referred to as a suction cup or suction nipple. The plurality of suction pins are typically arranged in a number of rows on the sucker.

The sucker is used to transport the workpiece and/or to remove the workpiece from a scrap skeleton if the workpiece has been formed from a sheet material. Additionally or alternatively to the removal tool in the form of a sucker, further removal tools may be used, for example grippers and/or extendable pins (thrust pins or lifting pins). If the workpiece has been formed from a sheet material, the sucker may be supported by one or more extendable pins as the workpiece is removed from a scrap skeleton. Alternatively, the workpiece may be pushed out or, as necessary, broken out from the scrap skeleton by means of one or more extendable pins; the sucker may then receive the workpiece separated from the scrap skeleton. The extendable pins may also be actuated on the basis of one or more parameters, and in particular positioned independently of the sucker. In particular, the method according to an embodiment of the present invention and its refined variants may also be used for the actuation of the extendable pins, in which case for example the at least one parameter may determine the positioning, lifting height and/or lifting force of said pins.

The determination of the characteristic variable in method step C) is preferably implemented in the form of a determination of an indirect characteristic variable from the at least one parameter and the at least one item of workpiece information. An advantageous refinement of this method variant provides that the sucker used in method step F) comprises a plurality of suction pins, and in method step B) at least one parameter in the form of a parameter for the suction pin actuation is generated, and that the indirect characteristic variable is determined from the at least one parameter for the suction pin actuation and the at least one item of workpiece information. A plurality of indirect characteristic variables are particularly preferably determined. An indirect characteristic variable is not directly accessible, but can be calculated from the other (direct) characteristic variables. A direct characteristic variable may describe, for example, the two-dimensional outer contour of the workpiece. When calculating the indirect characteristic variable, geometrical relationships can be suitably simplified. Typically, a large number of indirect characteristic variables, for example approximately 50, are calculated. With the aid of machine learning algorithms it is possible to identify the important characteristic variables via correlation analyses. In this case, a data evaluation based on an algorithm for classification, in particular on a self-improving algorithm, may be used.

A data evaluation, which is based on an algorithm for classification, in particular on a self-improving algorithm, may comprise one or more of the following evaluation steps:

a) a data-related processing of input data using a first processing dataset and first processing algorithms to form intermediate data;

b) in particular, a data-related processing of these intermediate data, and also further intermediate data obtained subsequently, using further processing datasets and further processing algorithms to form further intermediate data;

c) repeating of step b) in accordance with a predefined repetition algorithm;

d) wherein the processing datasets and processing algorithms are established with the aid of test datasets which comprise:
  input data, and
  workpiece information, characteristic variables and/or parameters, and preferably
  associated removal predictions (for example removal successful/unsuccessful or removal likely/unlikely);

e) wherein the establishment of the processing datasets and processing algorithms comprises the following steps:
  reading input data of the test datasets,
  establishing workpiece information, characteristic variables and/or parameters using predefined processing datasets and/or processing algorithms,
  comparing the established workpiece information, characteristic variables and/or parameters with the workpiece information, characteristic variables and/or parameters associated with the read input data, modifying the processing datasets and/or processing algorithms on the basis of the results of the comparison and in accordance with a predefined improvement algorithm, and repeating the aforementioned steps under e) until the workpiece information, characteristic variables and/or parameters established from the input data of the test datasets match those from the test datasets with a predefined minimum match rate.

The processing datasets may be datasets with factors, wherein the factors individually weight each of the data items to be processed. The processing algorithms may be algorithms that perform arithmetical, combinatorial and/or logical processing and that further process the relevant data in accordance with the predefined combinatorial, arithmetic and/or logical analysis principle.

The data evaluation may also be designed to use a plurality of improvement algorithms and to preferably use improvement algorithms that arrive more quickly or more reliably at a predefined conformity target with predefined standards. The data evaluation may also be designed to use a plurality of improvement algorithms, and to preferably use improvement algorithms that arrive more quickly or more reliably at a predefined conformity target with predefined standards. The date of valuation may also be designed to use a plurality of repetition algorithms, and to preferably use repetition algorithms that arrive more quickly or more reliably at a predefined conformity target with predefined standards.

In some embodiments the algorithmic evaluation of the workpiece information, characteristic variables and/or parameters may be performed using at least one neural network. In this case, the neural network is configured for specific workpiece information, characteristic variables and/or parameters in the industrial production plant. Furthermore, it may alternatively or additionally improve itself continuously. The workpiece information, characteristic variables and/or parameters are digital input values of the neural network, and the removal results are reproduced as digital starting classes in the neural network.

The concepts disclosed herein make it possible for a workpiece to be handled increasingly more reliably. The number of downtimes of the machines can be drastically reduced.

Furthermore, for example what are known as decision trees may be generated automatically from the collected data, that is to say a sequence of successive decisions in the value range of which the characteristic variable in question must lie in order to be able to assume a successful removal. Due to the use of indirect characteristic variables, the transferability of the removal results to workpieces having similar geometric properties can be improved. This allows for a more precise removal prediction.

The indirect characteristic variable is preferably based on:
a) the ratio between the suction force of the suction pins and the weight force of the workpiece;
b) the degree of coverage of the workpiece surface by the area of the suction pins;
c) the distance between the center of gravity of the suction pins from the center of gravity of the workpiece; and/or
d) the determination of the Voronoi areas of the suction pins.

It has been found that particularly good removal predictions can be created using these indirect characteristic variables. A Voronoi area can be determined by the splitting of an area, for example of a sheet material that is to be machined, into regions, wherein the regions are defined by a predefined amount of points of the area, referred to here as centers. Each region is determined by precisely one center and comprises all points of the area that lie closer to the center of the region than to any other center. Such regions are also referred to as Voronoi regions. The Voronoi diagram is created from all points that have more than one closest center and thus form the boundaries of the region. Within the scope of the present invention, the totality of Voronoi regions of the (active) suction pins can be used as the Voronoi area of the suction pins. This Voronoi area may define a convex envelope, which is spanned by the suction pins.

It is preferably provided that, in method steps D) and H), a removal result store in the form of a server-based or cloud-based removal result store is used. The data basis, i.e. the number of removal results, in the removal store can thus be increased. This makes it possible to create more accurate removal predictions.

A server-based removal result store may be a memory that is designed to electronically store and provide data on a data store that has a connection to a plurality of data processing devices arranged remotely from the data store. A server-based removal result store may be arranged inside or outside an organization unit, that is to say for example a factory or company. It may be accessed exclusively by this organization unit.

A cloud-based removal result store is a removal result store that can be arranged outside the organization unit, i.e. for example a factory or company. It is designed as a data store for a plurality of independent organization units. These may share functions, such as data storage and data processing. In this case the stored data may be further processed with a pre-settable information content also by third parties, in particular by a provider of the cloud-based removal result store. For example, information regarding workpieces and the frequency of successful removals may be read out. These removal results may be provided to all users of the cloud-based removal result store for the creation of removal predictions. This can be implemented with different levels of confidentiality, for example in the form of anonymized data.

After method step E), in the event of a negative removal prediction, the method is preferably carried out anew from method step B). In this case, a new value of the parameter for the removal tool or another parameter for the removal tool is used as a basis. This procedure may be repeated until a positive removal prediction is obtained in method step E). The method is particularly preferably carried out anew from method step B) under consideration of at least one already used parameter, at least one already used item of workpiece information and/or at least one already used characteristic variable. In this way, a parameter with a positive removal prediction can be established quickly.

It may be provided that the removal result is detected in method step G) by at least one sensor. The removal result is preferably detected by a plurality of sensors. The one or more sensors may be, for example, a limit switch, a camera and/or a light barrier. In this way, the removal result can be detected particularly reliably.

In a particularly simple case, the removal result may be digitally "good" or "poor." A removal prediction can be calculated on this basis, generally in the form of a likelihood. It is also possible that the removal result is provided and stored in the form of a continuous or graduated assertion, for example "very good," "good," "poor," "unsuccessful."

However, additional information regarding the type of result may also be added to the removal result, for example:
"separation from the scrap skeleton: "successful," "successful with multiple attempts," "unsuccessful";
"transport: "successful," "successful with multiple attempts," "unsuccessful";
"rotation during transport: "successful," "successful with multiple attempts," "unsuccessful";
"set-down": "successful," "successful with multiple attempts," "unsuccessful."

An embodiment of the present invention also includes a machine for carrying out a method according to an embodiment of the present invention, wherein the machine comprises the following:
a parameter-controlled removal tool;
ii) a removal result store for storing removal results;
iii) a control unit connected to the removal tool and the removal result store for processing at least one parameter for the removal tool and an item of workpiece information to form a characteristic variable.

The control unit may be designed to generate a parameter for the removal tool. The control unit is designed to create a removal prediction under consideration of the characteristic variable and at least one removal result from the removal result store. Furthermore, the control unit is designed to assess the removal prediction. The control unit is also designed to actuate the removal tool to remove the workpiece in the event of a positive removal prediction. In other words, in the event of a positive removal prediction, the machine performs a removal process with the parameter for the removal tool. The method according to an embodiment of the present invention can be carried out particularly advantageously with a machine of this kind.

The machine may comprise a machine tool for forming the workpiece. The machine tool is preferably designed in the form of a laser cutting machine tool and/or a punching machine tool. In the case of such a machine, the method according to an embodiment of the present invention can be integrated into the manufacturing process particularly elegantly.

The removal tool may be a sucker. The machine is then suitable in particular for carrying out a method in which a removal tool in the form of a sucker is used. A sucker is particularly suitable for handling workpieces, which have been manufactured from a sheet material. The sucker preferably has a plurality of suction pins. A sucker with a plurality of suction pins can be adjusted particularly well to different workpieces, in particular to workpieces of complex geometry, by actuating the suction pins by means of a parameter for the suction pin actuation. The parameter for the suction pin actuation may be generated in particular in method step B) of an above-described method according to an embodiment of the present invention.

Alternatively or additionally to the sucker, the removal tool, for example, may comprise a gripper and/or extendable pins (thrust pins or lifting pins). If the workpiece has been formed from a sheet material, the sucker can be supported by one or more extendable pins as the workpiece is removed from a scrap skeleton of the sheet material. Alternatively, the workpiece may be pushed out or, as necessary, broken out from the scrap skeleton by means of one or more extendable pins; the sucker may then receive the workpiece separated from the scrap skeleton. The extendable pins may also be actuated on the basis of one or more parameters, and in particular positioned independently of the sucker. A parameter for controlling the extendable pins may determine their positioning, lifting height and/or lifting force. Grippers may comprise the following technology, either individually or in combination:
mechanical forces, for example in the form of a mechanically emulated hand,
electrostatic forces,
magnetic forces.

Alternatively or additionally to the sucker, the gripper and/or the extendable pins, the removal tool may comprise a controllable discarding device, into which the workpiece is discarded once sorted. For example, this device may comprise a controllable chute or a controllable acceleration device.

The removal result store of the machine may be server-based or cloud-based. In this case, a server-based store means a memory that is stored on a server, which can be accessed only by a fabrication unit (business, organization unit), in particular at a fabrication location. This has the advantage that the data stored on it remain at the fabrication unit and are not exchanged with other fabrication units. A server-based removal result store of the machine may advantageously be integrated into the machine, for example into the control unit. Such a machine can carry out the method according to an embodiment of the present invention independently of further infrastructure. A (cloud-based) removal result store linked to a plurality of fabrication units or locations simplifies the exchange of removal results with other machines and in particular with other fabrication units. A much greater number of removal results and characteristic variables can thus be accessed. The data may be stored in anonymized form, i.e. without information regarding the fabrication units. There are thus no disadvantages for the fabrication units, and no anti-competitive data can be exchanged between competitors. In particular, a machine with a cloud-based removal result store may comprise a plurality of machine tools, each with a parameter-controlled removal tool. A cloud-based removal result store may be arranged physically removed from a plurality of businesses (fabrication units) not connected to one another.

The machine may comprise at least one sensor for detecting the removal result. The machine preferably comprises a plurality of sensors for detecting the removal result. The one or more sensors may be, for example, a limit switch, a camera and/or a light barrier. The control unit is typically designed to detect the removal result by means of the sensor or the sensors and to store the removal result in the removal result store.

The devices and/or methods proposed herein may allow correct recognition of the handling to be achieved with an increased accuracy. They may be used in particular in a manufacturing control system. The manufacturing control system may comprise an IVIES (Manufacturing Execution System). The IVIES may be designed to be connected via wireless or wired communication links to one or more manual workstations or automated workstations, for example machine tools, positioned in a production hall. Generally, the MES may be used to control process sequences/manufacturing steps in the industrial manufacture of workpieces with the workstations. To this end, the MES may receive information regarding the process sequences/manufacturing steps and status information relating to the workstations. The MES may be implemented in a data processing device. This may be an individual electronic data processing device (server) or a group of a plurality of data processing devices (server group/cloud). The data processing device or the group may be provided locally in the production facility or constructed externally, decentralized.

Further advantages and advantageous embodiments of the subject matter of the present invention will become clear from the description, the claims and the drawing. The above-mentioned features and also those yet to be described can be used individually or together in any combinations. The embodiments shown and described are not to be understood as a conclusive listing, but rather are of an exemplary nature for the description of the present invention.

FIG. 1 shows a machine 10 according to an embodiment of the present invention in a heavily schematic depiction. The machine 10 comprises a machine tool 12. The machine tool 12 is designed here as a laser cutting machine. Workpieces 14 are formed from a main body 16 by means of the machine tool 12. Here, the workpieces 14 are cut out from the main body 16 in the form of a sheet material.

The machine 10 also comprises a removal tool 18. The removal tool 18 is designed here as a sucker, which has a plurality of suction pins 20. The suction pins 20 (suction cups) are arranged here in a regular matrix, in particular are disposed in equidistant rows running in parallel or orthogonally to one another.

The removal tool 18 is parameter-controlled. By means of at least one parameter for the removal tool 18, the position of said tool relative to the main body 16 and the workpieces 14 arranged therein immediately after manufacture can be adjusted (see the double-headed arrows in FIG. 1). In addition, a parameter for the removal tool 18 can be used to select which of the suction pins 20 are to be used to remove a specific workpiece 14. Depending on the orientation of the workpieces 14, it may be necessary to use different suction pins 20 to remove a specific workpiece 14, in spite of a same form of the workpieces 14. By means of a further parameter, the negative pressure to be applied to the suction pins 20 can be adjusted. The negative pressure may be selected in particular depending on the weight of the workpiece 14 and the number of the suction pins 20 engaged with the workpiece 14.

The machine 10 also comprises a sensor 22. The sensor 22 is designed here as a camera. The camera is directed toward the main body 16 with the workpieces 14. Following the removal of one of the workpieces 14, it can be recognized by suitable image processing algorithms on the basis of the image of the camera that the workpiece 14 is no longer arranged in the main body 16, i.e. that the removal was successful. It can also be recognized if the workpiece 14 still remains in the main body 16 following a removal attempt, i.e. that the removal was not successful. This removal result can be stored in a removal result store 24 of the machine 10 together with information regarding the workpiece 14 and the parameter or the parameters for the removal tool 18. The removal result store 24 is cloud-based in this case, i.e. is designed as a cloud memory.

The machine also has a control unit 26. The control unit 26 is connected to the removal tool 18 and the removal result store 24. In other words, the control unit 26 can actuate the removal tool 18 and can retrieve data from the removal result store 24 and typically can also store data in the removal result store 24.

The control unit 26 is used to process at least one parameter for the removal tool 18 and at least one item of workpiece information to form a characteristic variable. The control unit 26 is designed to calculate a characteristic variable from the parameter for the removal tool 18 and the item of workpiece information. The parameter for the removal tool 18 can be generated by the control unit 26 itself or can be supplied to it from outside, for example from an operator of the machine 10 or from a master computer.

The control unit 26 is also designed to create and assess a removal prediction for one of the workpieces 14. To create the removal prediction, the control unit 26 consults the previously determined characteristic variable and at least one removal result from the removal result store 24. The control unit 26 may consider, in particular, how high the value was of the characteristic variable or of a comparable characteristic variable in the removal result from the removal result store 24 and whether or not the stored removal was successful. To evaluate the removal prediction, the control unit 26 may compare the value of the determined characteristic variable and the value of the characteristic variable from the removal result store 24. If, for example, the stored removal was successful and the characteristic variable increases with rising likelihood of success for the removal, the control unit 26 may evaluate the removal prediction as positive if the value of the determined characteristic variable is greater than the value of the characteristic variable from the removal result store 24.

The control unit 26 is also designed to actuate the removal tool 18 with the parameter if the removal prediction was positive in order to remove the workpiece 14. The sensor 22, as mentioned above, may detect the removal result of this removal attempt and provide it for storage in the removal result store 24. The control unit 26 may help in the detection of the removal result, for example by applying the necessary analysis algorithms to the data of the sensor 22, here the image of the camera. The control unit 26 may then store, in the removal result store 24, the removal result together with the parameter for the removal tool 18 and an item of workpiece information regarding the workpiece 14.

Figure 2:
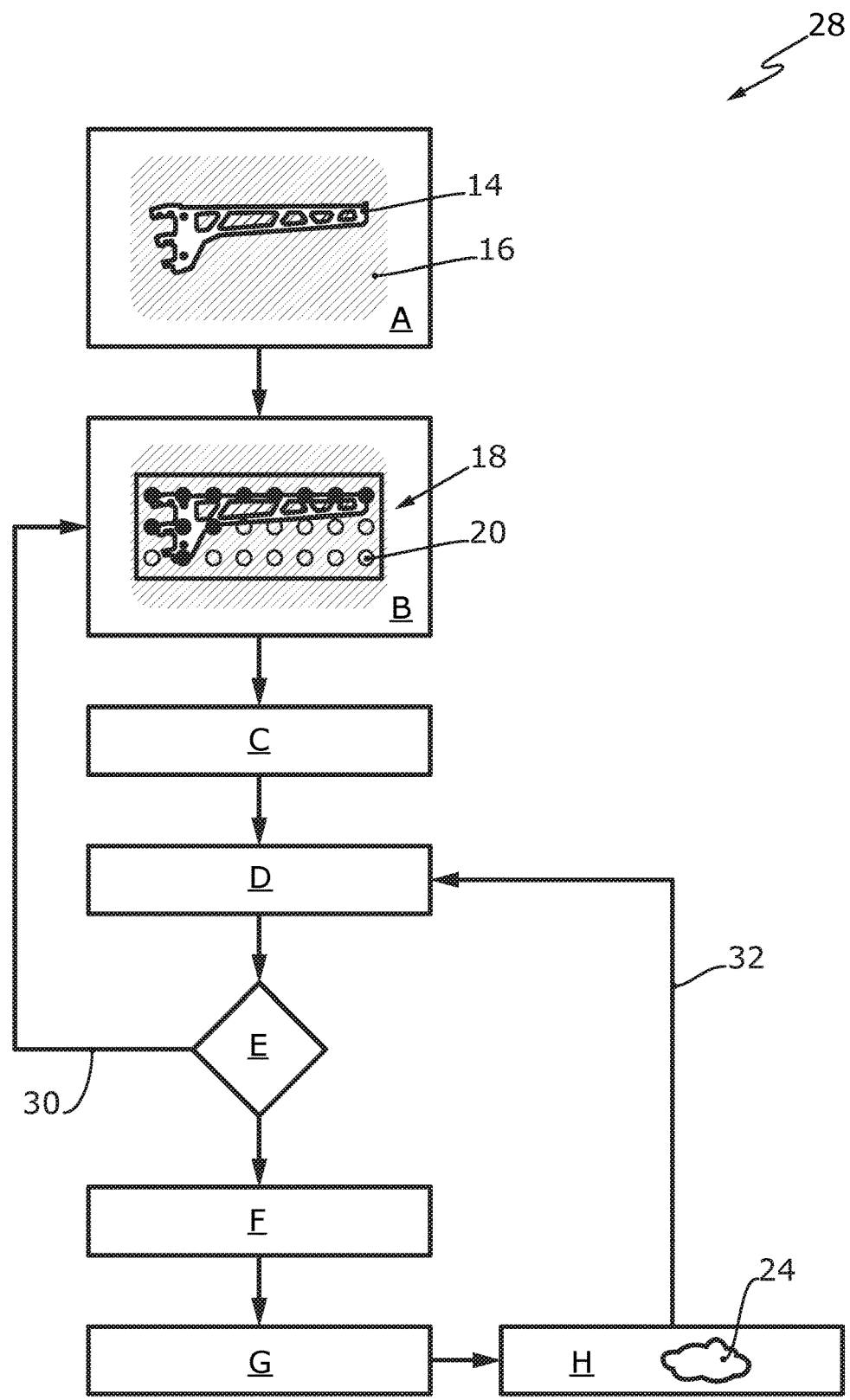
FIG. 2 shows a schematic flowchart of a method according to an embodiment of the present invention.

FIG. 2 shows a flowchart of a method 28 according to an embodiment of the present invention. The method 28 may be carried out with the machine 10 shown in FIG. 1. In a first method step A, a workpiece 14 is formed, for example by means of the machine tool 12 from FIG. 1. In a method step B at least one parameter is then generated for the removal tool 18. In the shown method variant a plurality of parameters are generated for the removal tool 18. These parameters in this case describe the positioning of the sucker of the removal tool 18 above the workpiece 14 and the activation of the suction pins 20 of the sucker. In FIG. 2 activated suction pins 20 are shown filled black; non-activated suction pins 20 appear as empty circles.

In a subsequent method step C a characteristic variable is determined from the parameters for the removal tool 18 and an item of workpiece information. The characteristic variable is in this case an indirect characteristic variable and specifies the degree of coverage of the surface of the workpiece 14 by the area of the activated suction pins 20.

In a subsequent method step D a removal prediction is determined on the basis of this characteristic variable. In this case, the influence 32 of at least one removal result from the removal result store 24 is taken into account. In other words, the value of the characteristic variable or of a comparable characteristic value and the result of a stored removal are used to determine the removal prediction. Typically, a plurality of stored removals are considered. When creating the removal prediction, a likelihood for a successful removal with the selected parameters for the removal tool 18 can then preferably be calculated.

The removal prediction is then evaluated in a method step E. If the removal prediction specifies a likelihood for a successful removal, it can be checked whether this likelihood lies above a limit value. Alternatively, it can be checked whether the removal prediction can be summarized by "removal is expected to be successful". In the event of a negative removal prediction 30, the method is repeated from method step B. In this case, at least one of the parameters for the removal tool 18 is changed. For the change of the parameter for the removal tool 18, a historical parameter from the removal result store 24 with which the removal was successful is preferably taken into account. For example, a greater negative pressure for the suction pins 20 can be provided if the successful removals in the removal result store 24 reveal that a greater holding force of the removal tool 18 is necessary.

If the removal prediction is positive, a removal of the workpiece 14 with the selected parameters for the removal tool 18 is performed in a method step F. In a subsequent method step G, the removal result is determined, for example is detected by means of the sensor 22. This removal result is then stored in the removal result store 24 in a method step H together with the applied parameters for the removal tool 18 and at least one item of workpiece information. The removal result store 24 then comprises an enlarged data basis, which can be used to create a removal prediction in method step E when the method according to an embodiment of the present invention is run through again. In other words, the influence 32 of the removal result of the removal process performed within the scope of the method according to an embodiment of the present invention can now be taken into account when creating the removal prediction in method step E of a renewed run-through of the method according to an embodiment of the present invention. The reliability and/or accuracy of the removal prediction thus increases each time the method is performed.

While embodiments of the invention have been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A method for handling a workpiece with a removal tool, the method comprising:
    A) forming the workpiece at a processing location;
    B) generating at least one parameter for controlling the removal tool;
    C) determining at least one characteristic variable from the at least one parameter and at least one item of workpiece information, the at least one characteristic variable indicating at least one characterizing feature of a removal of the workpiece to be performed according to the at least one parameter and the at least one item of workpiece information;
    D) creating a removal prediction taking into account the characteristic variable and at least one assessed removal result from a removal result store, the removal prediction specifying a likelihood of a successful removal of the workpiece, the removal result store for storing assessed removal results, each of the assessed removal results indicating information on a success or quality of a prior removal of another workpiece;
    E) assessing the removal prediction to determine whether the removal prediction is one of a positive removal prediction or a negative removal prediction, the positive removal prediction being determined upon the assessment of the removal prediction indicating the likelihood of the successful removal of the workpiece exceeding a predetermined threshold;
    F) removing the workpiece from the processing location in the event of determining the positive removal prediction;
    G) detecting the removal result, the removal result indicating information on a success or quality of the removal of the workpiece; and
    H) storing the removal result in the removal result store, wherein the method step A is performed prior to the method step B.

2. The method according to claim 1, wherein in the method step F) a removal tool in the form of a sucker is used, and wherein in the method step B) the at least one parameter for the removal tool comprises a parameter for the sucker.

3. The method according to claim 2, wherein the sucker used in the method step F) has a plurality of suction pins, and wherein in the method step B) the at least one parameter comprises a suction pin actuation parameter.

4. The method according to claim 1, wherein the determination of the characteristic variable in the method step C) comprises a determination of an indirect characteristic variable from the at least one parameter and the at least one item of workpiece information.

5. The method according to claim 3, wherein the determination of the characteristic variable in the method step C) comprises a determination of an indirect characteristic variable from the at least one parameter for the suction pin actuation and the at least one item of workpiece information.

6. The method according to claim 5, wherein the indirect characteristic variable determination is based on:
    a) a ratio between a suction force of the suction pins and a weight force of the workpiece;
    b) a degree of coverage of a workpiece surface by an area of the suction pins;
    c) a distance between a center of gravity of the suction pins from a center of gravity of the workpiece; or
    d) a determination of Voronoi areas of the suction pins.

7. The method according to claim 1, wherein in the method step D) and the method step H) the removal result store is a server-based or cloud-based removal result store.

8. The method according to claim 1, the method comprising, in the method step E, assessing a negative removal prediction, and after method the step E), based on determining the negative removal prediction, the method is carried out anew from the method step B).

9. The method according to claim 8, wherein, upon the method being carried out anew from the method step B), the at least one parameter comprises at least one already used parameter from a prior iteration of the operation of the method, the at least one item of workpiece information comprises at least one already used item of workpiece information from the prior iteration of the operation of the method, or the at least one characteristic variable comprises at least one already used characteristic variable from a prior iteration of the operation of the method.

10. The method according to claim 1, wherein the removal result is detected in the method step G) by at least one sensor.

11. A machine for handling a workpiece, the machine comprising:
  i) a machine tool configured to form the workpiece at a processing location;
  ii) a removal tool configured to be controlled according to at least one parameter;
  iii) a removal result store for storing assessed removal results, each of the assessed removal results indicating information on a success or quality of a prior removal of another workpiece; and
  iv) a controller connected to the removal tool and the removal result store, the controller being configured to:
    process the at least one parameter for controlling the removal tool and an item of workpiece information to determine a characteristic variable, the characteristic variable indicating a characterizing feature of a removal of the workpiece to be performed according to the at least one parameter and the at least one item of workpiece information;
    create a removal prediction under consideration of the characteristic variable and at least one assessed removal result from the removal result store, the removal prediction specifying a likelihood of a successful removal of the workpiece;
    evaluate the removal prediction to determine whether the removal prediction is one of a positive removal prediction or a negative removal prediction, the positive removal prediction being determined upon the assessment of the removal prediction indicating the likelihood of the successful removal of the workpiece exceeding a predetermined threshold; and
    actuate the removal tool to remove the workpiece based upon evaluating the removal prediction to be the positive removal prediction.

12. The machine according to claim 11, wherein the removal tool comprises a sucker, and wherein the at least one parameter for the removal tool comprises a parameter for the sucker.

13. The machine according to claim 12, wherein the sucker comprises a plurality of suction pins, and wherein the at least one parameter comprises a suction pin actuation parameter.

14. The machine according to claim 11, wherein the removal result store is server-based or cloud-based.

15. The machine according to claim 11, wherein the machine comprises at least one sensor configured to detect the removal result.

* * * * *